Nov. 28, 1939. O. MOLIN 2,181,666
DOUGH ROLLING MEANS
Filed April 7, 1939 2 Sheets-Sheet 1

Inventor
Oscar Molin

By *Clarence A. O'Brien*
*and Hyman Berman*
Attorneys

Nov. 28, 1939.  O. MOLIN  2,181,666
DOUGH ROLLING MEANS
Filed April 7, 1939   2 Sheets-Sheet 2
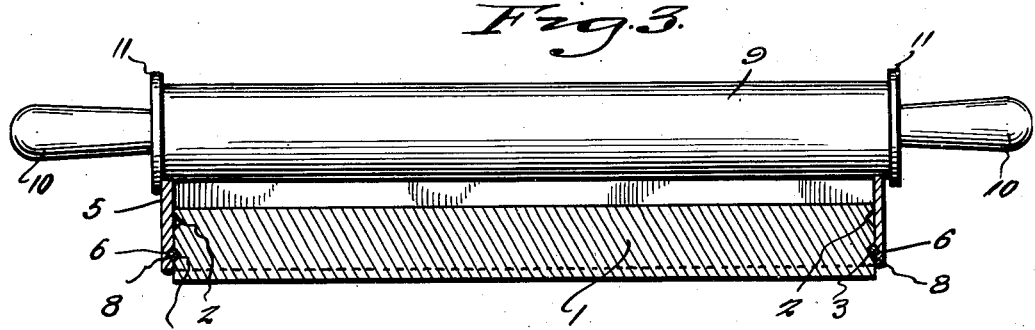
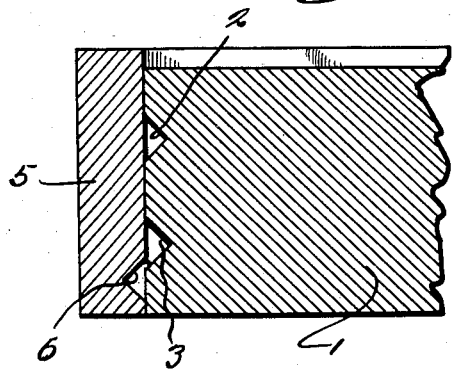
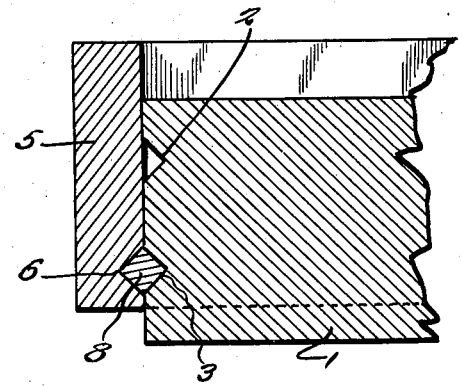
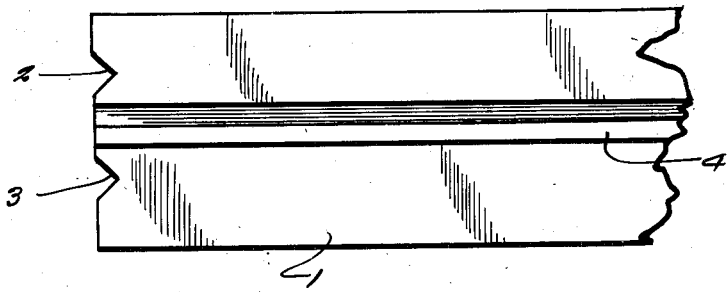
Inventor
Oscar Molin
By Clarence A. O'Brien
and Hyman Berman
Attorneys Patented Nov. 28, 1939

2,181,666

UNITED STATES PATENT OFFICE 2,181,666

DOUGH ROLLING MEANS

Oscar Molin, Port Arthur, Tex.

Application April 7, 1939, Serial No. 266,619

3 Claims. (Cl. 107—46)

The present invention relates to new and useful improvements in dough rolling means and has for its primary object to provide, in a manner as hereinafter set forth, a novel combination and arrangement whereby the dough may be expeditiously rolled to a uniform thickness.

Another very important object of the invention is to provide a unique construction whereby the dough may be conveniently rolled to different thicknesses for different purposes, such as for pie crusts, biscuits, etc.

Other objects of the invention are to provide a dough rolling means of the character described, which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a cross sectional view, showing a rolling pin mounted in position for use.

Figure 4 is a fragmentary view in vertical section, taken substantially on the line 4—4 of Fig. 1, showing one adjustment of the frame relative to the board.

Figure 5 is a view substantially similar to Fig. 4 but showing another adjustment of the frame relative to the board.

Figure 6 is an elevational view of a portion of the board.

Figure 1:
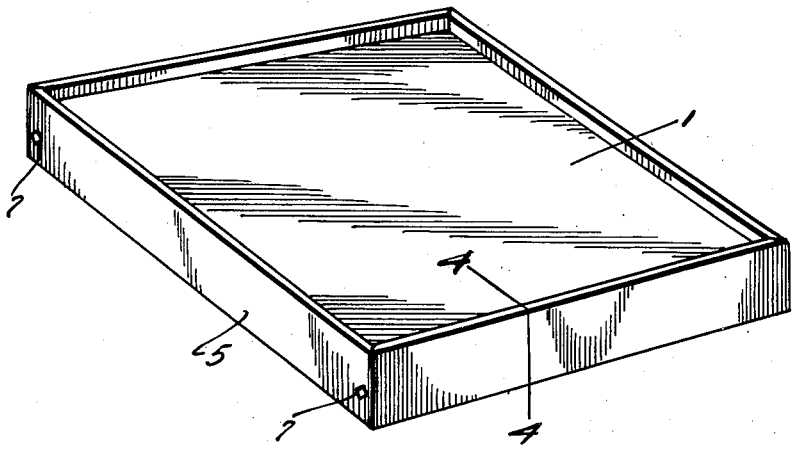
Figure 1 is a perspective view of a rolling board and frame constructed in accordance with the present invention.
Figure 2:
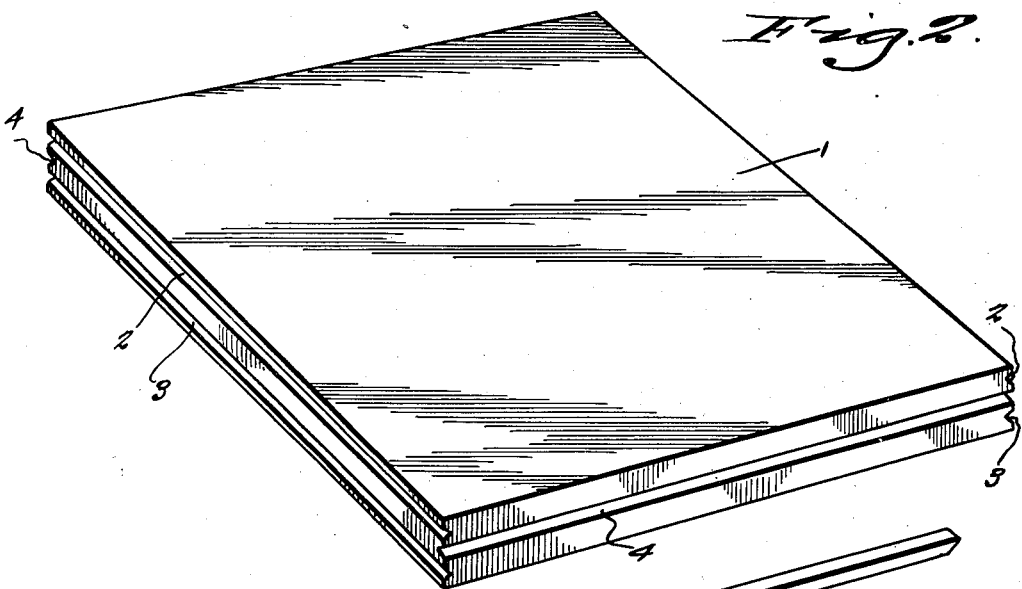
Figure 2 is a perspective view of the board.
Figure 7:
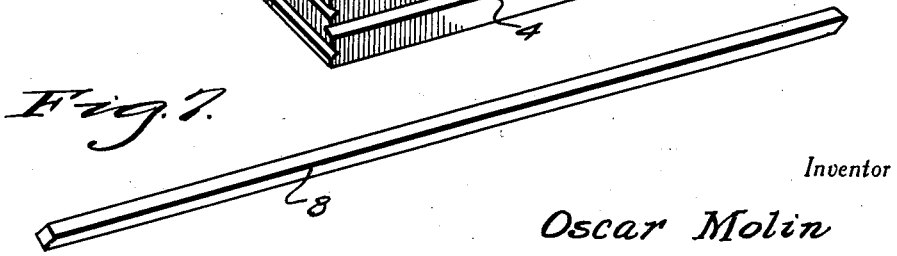
Figure 7 is a detail view in perspective of one of the removable pins or keys.

Referring now to the drawings in detail, it will be seen that the embodiment of the invention which has been illustrated comprises a square board 1 of suitable material, preferably wood, said board being of any suitable dimensions. In two of its opposite edges the board 1 has formed therein substantially V-shaped, vertically spaced grooves or keyways 2 and 3. In each of its other two opposite edges the board 1 has formed therein a similar keyway 4. It will be observed that the keyways 4 are located intermediate the horizontal planes of the keyways 2 and 3.

Enclosing the board 1 is a removable and adjustable frame 5 which may also be of any suitable material, such as wood. Two of the opposite walls of the frame 5 have formed therein substantially V-shaped keyways 6 which are adapted to be brought selectively into registry with the keyways 2, 3 and 4. One of the remaining walls of the frame 5 has formed in its end portions openings 7 which communicate with the keyways 6. The reference numeral 8 designates a pair of keys of wood or other suitable material which are insertable in the registering keyways in the board 1 and the frame 5 for locking said frame in adjusted position on said board. This is shown to advantage in Figs. 3 and 5 of the drawings. The keys 8 are adapted to be inserted and removed through the openings 7. Referring to Fig. 4 of the drawings, it will be noted that the frame 5 is of a greater height than the board 1.

The reference numeral 9 designates a rolling pin (see Fig. 3) which is adapted to travel over the frame 5. The rolling pin 9 is provided on its ends with the usual handles 10. The rolling pin 9 is also provided with guide flanges 11 on its ends for engagement with the frame 5.

It is thought that the manner in which the invention functions will be readily apparent from a consideration of the foregoing. The dough is, of course, placed on the board 1 with the frame 5 in position. The rolling pin 9 is then moved over the board on the frame 5 and in this manner the dough is rolled to a uniform thickness corresponding to the distance that the frame 5 projects above said board. The construction and arrangement is such that four different adjustments may be had. When a thin dough is desired for pie crusts, for example, the keys 8 are removed and the frame 1 is permitted to rest on the surface which supports the board 1, as seen in Fig. 4 of the drawings. This is the lowest adjustment of the frame 5. When a thicker dough is desired, the frame 5 is elevated to bring the keyways 6 into registry with the lowermost keyways 3 in the board 1 and the keys 8 are inserted through the openings 7 thus locking said frame in adjusted position on the board. When a comparatively heavy or thick dough is desired the frame 5 is elevated to bring the keyways 6 into registry with the uppermost keyways 2 after which the keys 8 are inserted. When an intermediate thickness of dough is desired, the frame 5 is removed, given a quarter turn and replaced on the board 1 with the keyways 6 in registry with the keyways 4, after which the keys 8 are inserted. Of course, other combinations and arrangements of keyways may be provided for different adjustments of the frame 5.

It is believed that the many advantages of a dough rolling means constructed in accordance with the present invention will be readily understood and although a preferred embodiment of the invention is as illustrated and described, it is to be understood that changes in the details of construction may be resorted to which will fall within the scope of the invention as claimed.

What is claimed is:

1. A dough rolling means comprising a board, a frame mounted for vertical adjustment on said board and extending thereabove, and means for releasably securing the frame in adjusted position on the board, said means including keys, the board and the frame having opposed keyways therein for the reception of said keys.

2. A dough rolling means comprising a board having vertically spaced keyways in its edges, a vertically adjustable frame mounted on the board and extending thereabove, said frame having keyways therein adapted to be brought selectively into registry with the first named keyways, and keys engageable in the registering keyways for releasably securing the frame in adjusted position.

3. A dough rolling means comprising a square board having vertically spaced keyways in two of its parallel edges and further having keyways in its other two parallel edges intermediate the horizontal planes of the first named keyway, a vertically adjustable frame removably mounted on the board, said frame having keyways therein adapted to be brought into registry with any of the first named keyways, and keys engageable in the registering keyways for releasably locking the frame in adjusted position on the board.

OSCAR MOLIN.